(12) United States Patent
Chan et al.

(10) Patent No.: US 9,146,716 B2
(45) Date of Patent: *Sep. 29, 2015

(54) AUTOMATIC RESOURCE BALANCING FOR MULTI-DEVICE APPLICATIONS

(71) Applicant: NEXTBIT SYSTEMS INC., San Francisco, CA (US)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

(73) Assignee: NEXTBIT SYSTEMS INC.

( * ) Notice: Subject to any disclaimer, the term of this patent is extended or adjusted under 35 U.S.C. 154(b) by 6 days.

This patent is subject to a terminal disclaimer.

(21) Appl. No.: 14/220,984

(22) Filed: Mar. 20, 2014

(65) Prior Publication Data

US 2014/0289413 A1    Sep. 25, 2014

Related U.S. Application Data

(60) Provisional application No. 61/804,134, filed on Mar. 21, 2013.

(51) Int. Cl.
*G06F 15/173* (2006.01)
*G06F 9/45* (2006.01)
*G06F 9/54* (2006.01)
(Continued)

(52) U.S. Cl.
CPC .. *G06F 8/44* (2013.01); *G06F 9/54* (2013.01); *G06F 11/1464* (2013.01); *G06F 17/3053* (2013.01); *G06F 17/30174* (2013.01); *G06F 17/30194* (2013.01); *G06F 17/30575* (2013.01); *H04L 41/0816* (2013.01); *H04L 47/70* (2013.01); *H04L 47/78* (2013.01); *H04L 63/0853* (2013.01); *H04L 67/10* (2013.01);
(Continued)

(58) Field of Classification Search
CPC ..... H04L 47/822; H04L 67/327; H04L 47/76; G06F 9/5083
USPC ........................................................ 709/226
See application file for complete search history.

(56) References Cited

U.S. PATENT DOCUMENTS 6,609,212 B1 *  8/2003  Smith ............................. 714/4.5
7,249,179 B1 *  7/2007  Romero et al. ............... 709/226
(Continued)

OTHER PUBLICATIONS

Notice of Allowance mailed on Feb. 10, 2015, in U.S. Appl. No. 14/252,616, Chan, M.A., et al., filed Apr. 14, 2014.
(Continued)

*Primary Examiner* — Phuoc Nguyen

(57) ABSTRACT

At least one embodiment of this disclosure includes a method of resource balancing execution of an application involving multiple devices. The method can include: identifying an application executing on an operating system of a first computing device; identifying a resource type to facilitate the executing of the application; identifying multiple computing devices each having at least an available resource instance of the identified resource type, wherein the multiple computing devices are reachable by a communication protocol of the first computing device; and selecting a target computing device to offer up a target resource instance of the resource type to the application based at least partly on a comparable limitation of each available resource instance of the multiple computing devices.

30 Claims, 6 Drawing Sheets

(51) Int. Cl.

| | | |
|---|---|---|
| *G06F 17/30* | (2006.01) | |
| *H04L 29/08* | (2006.01) | |
| *G06F 11/14* | (2006.01) | |
| *H04L 12/24* | (2006.01) | |
| *H04L 12/911* | (2013.01) | |
| *H04L 29/06* | (2006.01) | |
| *H04W 12/06* | (2009.01) | |

(52) U.S. Cl.
CPC ............ *H04L 67/1095* (2013.01); *H04L 69/04* (2013.01); *H04W 12/06* (2013.01)

(56) References Cited

U.S. PATENT DOCUMENTS

| | | | |
|---|---|---|---|
| 2003/0120778 A1* | 6/2003 | Chaboud et al. | 709/225 |
| 2003/0236813 A1* | 12/2003 | Abjanic | 709/102 |
| 2006/0129676 A1* | 6/2006 | Modi et al. | 709/227 |
| 2006/0184626 A1* | 8/2006 | Agapi et al. | 709/205 |
| 2011/0145392 A1* | 6/2011 | Dawson et al. | 709/224 |
| 2013/0073724 A1* | 3/2013 | Parashar et al. | 709/224 |

* cited by examiner

AUTOMATIC RESOURCE BALANCING FOR MULTI-DEVICE APPLICATIONS

CROSS-REFERENCE TO RELATED APPLICATION(S)

This application claims to the benefit of U.S. Provisional Patent Application No. 61/804,134, entitled "OPERATING SYSTEM AND DEVICE INTEGRATED WITH CLOUD COMPUTING FUNCTIONALITIES," which was filed on Mar. 21, 2013, which is incorporated by reference herein in its entirety.

RELATED FIELDS

At least one embodiment of this disclosure relates generally to cloud computing, and in particular to mobile device based cloud computing.

BACKGROUND

A mobile device can run multiple user interfacing applications (e.g., mobile games, e-readers, Web browsers, navigation applications, social networking applications, productivity applications, etc.) supported by many background services (e.g., global positioning system (GPS) service, short message service (SMS), video camera service, touchscreen keyboard service, etc.). The user of the mobile device, often times, is also an owner of multiple other computing devices (e.g., mobile phones, tablet computers, laptop computers, virtual operating systems, etc.). The current ecosystem of mobile computing devices does not provide a system platform for the owner to dedicate resources from his/her other computing devices to support the user interfacing applications running on the mobile device, thus wasting valuable potential resources.

A mobile application can sometimes be configured to receive support from a backend server provided by a commercial entity that provides the mobile application. For example, a social networking application can provide a backend server that stores user profiles on the backend server. However, the support from the backend server is limited to pre-configured functionalities and cannot be dynamically controlled by the user.

DISCLOSURE OVERVIEW

The disclosed technology is directed at methods and systems of facilitating an application of a first computing device to secure external resources from external computing devices. The first computing device and the computing devices can be co-owned by the same user. The disclosed technology can include, for example, methods and systems of facilitating a mobile application interfacing with the user to improve the user experience by securing the external resources. The disclosed technology is advantageous by providing a resource-sharing platform to discover resources in multiple computing devices associated with a user, compare the resources, and utilize the resources while minimizing detrimental impact on the multiple computing devices and maximizing user experience for that user. This can be accomplished by concerting the resources of an entire network of computing devices associated with the user.

The resource-sharing platform can be implemented via various resource-brokering techniques, each enabling a computing device to open up a secure channel for an external computing device to discover and assess the computing device's resources and ultimately utilize the resources. For example, the various resource-brokering techniques can provide a process for a user to verify his or her identity by providing one or more medium for authentication. For example, the user identity can be verified through a knowledge factor (e.g., a login and a password, a cryptographic key, etc.), a possessive factor (e.g., proximity to a mobile device, physical control of the mobile device, etc.), or an inherent factor (e.g., a fingerprint, a vocal feature, etc.).

In some embodiments, the resource-sharing platform is enabled by a resource-brokering process within each computing device of the user. In these embodiments, Internet connectivity is not required to utilize the resource-sharing platform. A resource requesting application in a computing device can directly discover and assess available resources of a particular resource type. For example, the resource requesting application through the resource brokerage process can communicate with external computing devices of the available resources via Bluetooth, Wi-Fi direct, near field communication (NFC), etc., or any combination thereof. In other embodiments, the resource-sharing platform is enabled by one or more resource-brokering servers that are connected to the available computing devices. The term "resource brokerage agent" in this disclosure refers to either a resource-brokering process or a resource-brokering server.

For example, the resource-sharing platform can select a target resource from amongst a set of resources by retrieving comparable limitations of the multiple computing devices or the resources. The comparable limitations can be static limitations (e.g., display size, display resolution, processor speed, memory speed, etc.) or dynamic limitations (e.g., device temperature, network lag, user engagement status, local proximity to the user, the mobile device, or another relevant person or device, etc.). Amongst the dynamic limitations, the resource-sharing platform can also monitor consumable limitations (e.g., battery charge, battery life expectancy, network usage, memory space availability, processor availability, screen real estate, service license, etc.), regardless of whether or not the consumable limitations are regenerative (e.g., recharging of the battery, monthly replenishing of network usage allowance, etc.).

Some embodiments of this disclosure have other aspects, elements, features, and steps in addition to or in place of what is described above. These potential additions and replacements are described throughout the rest of the specification.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

The term "resource" herein refers to one or more provisions, services, or functionalities of a computing device. A primary resource is one or more of the provisions, services, or functionalities that can be dedicated to an application (e.g., running on the computing device or on an external device) to enhance user experience associated with using the application. A secondary resource is a resource that has to be used when a primary resource is utilized by an application.

The term "comparable limitation" here refers to a dynamic or static condition of an available resource from a computing device, where the condition prevents or reduces the ability of the computing device to enhance the user experience that can be provided through the available resource.

Figure 1:
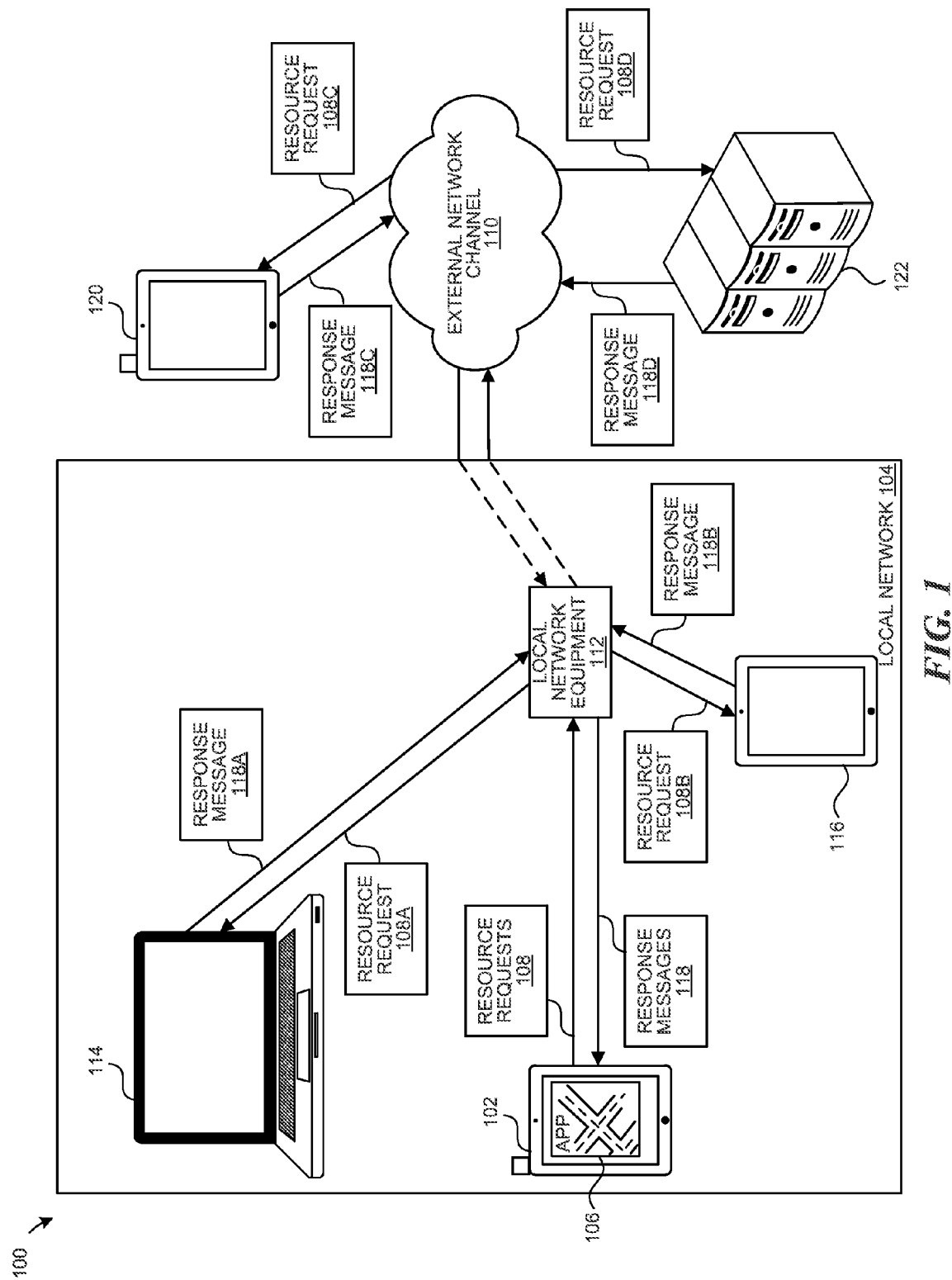
FIG. 1 is a data flow diagram of a mobile application requesting resources across a cloud computing system, in accordance with various embodiments.

FIG. 1 is a data flow diagram of a mobile application requesting resources across a cloud computing system 100, in accordance with various embodiments. The cloud computing system 100 is implemented as a network of multiple computing devices to provide a resource-sharing platform. The computing devices can include mobile devices (e.g., smart phones, tablets, laptops, etc.) or stationary and quasi-stationary devices (e.g., desktop computers, data centers, computer servers, smart televisions, virtual appliances, etc.). For example, the cloud computing system 100 can include a first computing device 102. In the illustrated example, the first computing device 102 is a smart phone connected to a local network 104.

One of the computing devices, such as the first computing device 102, can execute an application 106. The application 106 can be a user interfacing application (e.g., a mobile application, a browser application, a desktop application, etc.) or a background process in support of a user interfacing application. In the illustrated example, the application 106 is a navigation application. The application 106 can send resource requests 108 over a network, such as the local network 104 or an external network channel 110, to request commitment of external resources to facilitate the execution of the application. For example, the application 106 may require external resources in order to complete a task for a user. For another example, the application 106 may desire external resources because they can otherwise enhance the user experience for a user.

The first computing device 102 can communicate with other computing devices on the local network 104 either by itself (e.g., via Bluetooth, Wi-Fi Direct, Near Field Communication (NFC), etc.) or by routing through a local network equipment 112 (e.g., a switch, a router, a hub, an access point, a gateway, etc.). For example, the first computing device 102 can send the resource requests 108 to other computing devices through the local network equipment 112. The other computing devices may include a second computing device 114 (e.g., a laptop as illustrated) and a third computing device 116 (e.g., a tablet as illustrated).

For example, the resource requests 108 can include a first resource request 108A and a second resource request 108B. The first resource request 108A can be a request to use a graphics card and a display of a nearby device. The application 106 can contact a resource brokerage agent (not shown) to select a computing device from amongst multiple computing devices within the cloud computing system 100 to fulfill the first resource request 108A. In the illustrated example, the resource brokerage agent can select the second computing device 114 because of its proximity to the first computing device 102 and its possession of a graphics card and display.

The resource brokerage agent can be an internal resource-brokering process (e.g., a process within the first computing device 102) or an external resource-brokering device or service (e.g., a device or service outside of the first computing device 102). The external resource-brokering device can be one of the multiple computing devices (e.g., the first computing device 102, the second computing device 114, or the third computing device 116 in the cloud computing system 100). The selection process may include the disclosed resource balancing mechanism.

The resource brokerage agent can maintain a list of computing devices with available resources to be claimed. The list of computing devices can be dynamically discovered upon receiving a resource request. The list of computing devices can also be a static list updated periodically either by an external system or via an operator. Availability can be defined as capable of being reached through a network and/or a communication protocol. Availability can further be defined by being accessible to a user profile or user account operating or associated with the first computing device 102 and/or the application 106.

Each of the resource requests 108 may include one or more of resource types, device functionality requirements, response schedules, or device attributes. A resource type describes the specific device functionality or service that an application requires or desires. The resource type may be a hierarchy of enumerated categories. The resource type can be a data resource, a task resource, or an access resource. A data resource provides information to an application, including metadata, sensor data, user input, user account data, etc., or any combination thereof. A task resource executes a command or task (e.g., a computational task, an output task, etc.) for an application. The task or command can demand a return message (e.g., a computational task that returns a computed value). An access resource facilitates access to a third-party device or network (e.g., a private network, a global network, a storage network, etc.). Device functionality requirements further describe the necessary device characteristics of a computing device that can respond to a resource request. A response schedule describes one or more deadlines in regards to the expected allocation of a resource from a computing device (e.g., when to respond to a resource request and/or when to deliver the resource). In the case of a task resource, the response schedule may include a schedule of when to complete the task or command. A device attribute describes a circumstantial condition that a responding computing device has to be in, such as the responding computing device's absolute or relative location.

The resource brokerage agent can identify a subset of the list of computing devices that satisfy the designated resource type, device functionality requirements, and response schedule. For example, the second resource request 108B can be a data request for devices with a GPS that can respond immediately with a location of the user of the application 106. In this example, the resource type is a data resource, and in particular a location data resource. Presence of a GPS component is a device functionality requirement of the second resource request 108B. An immediate (i.e., substantially immediate) response time is a response schedule associated with the second resource request 108B. Proximity to the first computing device 102 is a device attribute associated with the second resource request 108B. The third computing device 116 may be selected from the subset because of its GPS component availability. In this example, the third computing device 116 is selected over the first computing device 102's own GPS component because the third computing device 116 has more battery life left (i.e., a comparable limitation) to run the GPS component than the first computing device 102. The resource brokerage agent can further consider that the third computing device 116 has a higher accuracy GPS component.

As in the example, if the subset of the computing devices includes two or more computing devices, the resource brokerage agent can implement the resource balancing mechanism to select a target resource source (e.g., a computing device) from the subset based on comparable limitations of the computing devices in the subset. The comparable limitations can be any of the examples described above.

For example, the resource brokerage agent can direct the first resource request 108A (e.g., the task resource of using a graphics card) to the second computing device 114. Responsive to the first resource request 108A, the second computing device 114 can perform the task and notify the application 106 when the task is completed via a first response message 118A. Similarly, the resource brokerage agent can direct the second resource request 108B to the third computing device 116. Responsive to the second resource request 108B, the third computing device 116 can deliver the GPS location of the user to the first computing device 102 for use by the application 106. The GPS location can be delivered along with a second response message 118B.

In embodiments, the resource brokerage agent can direct the resource requests 108 to computing devices (e.g., a fourth computing device 120 or a fifth computing device 122) connected to the external network channel 110. For example, the resource requests 108 can include a third resource request 108C requesting a data resource. The resource brokerage agent can determine that only a computing device in the external network channel 110 has the available data. Accordingly, the resource brokerage agent can direct the third resource request 108C to the fourth computing device 120. The fourth computing device 120, for example, can be a smart phone of the user's spouse, the user being the user of the application 106. The fourth computing device 120 can capture the requested data, such as a GPS location of the spouse, and return the requested data in a third response message 118C back to the application 106.

As another example, the resource requests 108 can include a fourth resource request 108D requesting a task resource. The fifth computing device 122, for example, can be a virtual operating system (e.g., running on a server system) assigned to a user account associated with the user of the application 106. The resource brokerage agent can select the fifth computing device 122 from amongst multiple computing devices to perform the task associated with the fourth resource request 108D. The fifth computing device 122 can send a response message 118D back to the application 106 indicating a commitment to the task. In some embodiments, the fifth computing device 122 sends the response message 118D back to the application 106 when the task is completed.

In the above examples, a resource requesting process for the application 106 can encrypt the resource requests 108 before sending the resource requests 108 to the rest of the cloud computing system 100. The resource requesting process can generate the resource requests 108 and include one or more user account authentication parameters in the resource requests 108 to verify the application 106's authority to utilize respective resources.

Figure 2:
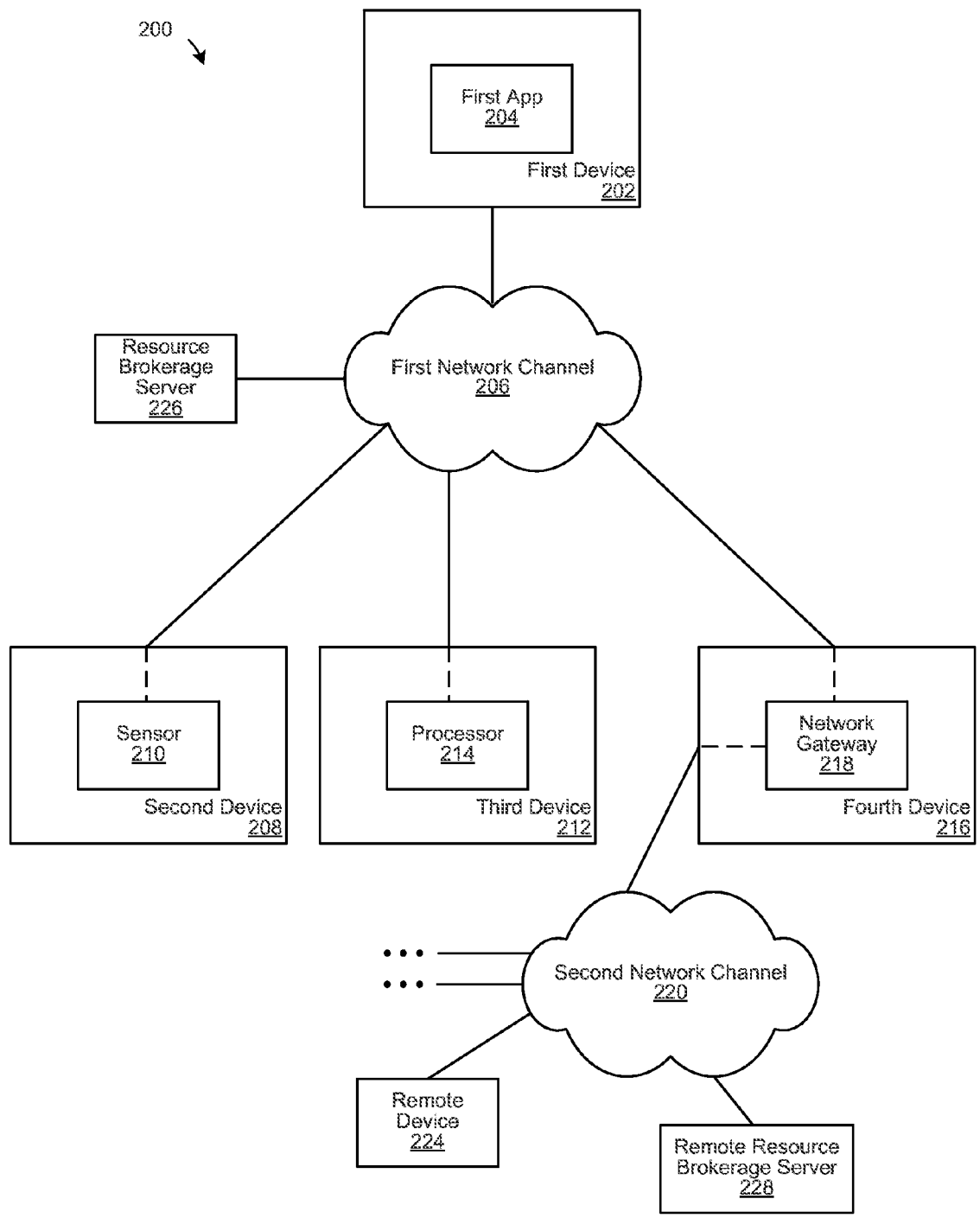
FIG. 2 is an example system environment of a cloud computing environment, in accordance with various embodiments.

FIG. 2 is an exemplary system environment of a cloud computing system 200, in accordance with various embodiments. The cloud computing system 200 can be the cloud computing system 100 of FIG. 1. The cloud computing system 200 is a cloud computing platform that enables any device within the cloud computing platform to acquire commitment of resources from other devices in the cloud computing platform. For example, a first device 202 can execute a first application 204 (e.g., a mobile application, a desktop application, a browser-based application, etc.). The first application 204 may be connected to a first network channel 206, such as a local network.

The cloud computing system 200 is enabled by the presence of a resource brokerage agent within the cloud computing network (e.g., one of the computing devices within the cloud computing system 200). This resource brokerage agent enables the first application 204 to utilize components in other devices (e.g., a second device 208 with a sensor component 210, a third device 212 with a processor component 214, a fourth device 216 with a network gateway component 218, etc.) of the cloud computing system 200. The network gateway component 218 can enable access to a second network channel 220 that is coupled to other computing devices (e.g., a remote device 224).

In one example, the second device 208 provides sensor data from the sensor component 210 to the first application 204. The second device 208 can be selected to service the first application 204 when the second device 208 can better serve the first application 204 than any other devices in the cloud computing network. For example, the sensor component 210 can be more accurate than other sensor components in the cloud computing network. As another example, the second device 208 may be the device, amongst devices with the same type of sensor components, which has the highest amount of battery life left. That is, the second device 208 can be selected to service the first application 204 based on a comparable limitation of a secondary consumable resource. A secondary consumable resource herein refers to a limited resource that is consumed when another resource is utilized by the cloud computing system 200.

In another example, the third device 212 provides the processor component 214 to execute commands or tasks requested by the first application 204. In yet another example, the fourth device 216 provides the network gateway component 218 to bridge network access to the second network channel 220, including access to the remote device 224. The cloud computing system 200 can also include devices with output components (e.g., display component, speaker component, mechanical or electrical control component, etc.). In embodiments, the cloud computing system 200 creates a platform for applications to utilize devices that enhance the user experience of the application or reduce overall resource consumption across the entire cloud computing network (e.g., by implementing the disclosed resource balancing mechanism to select resource sources with a higher amount of consumable resources).

In some embodiments, the resource brokerage agent is a resource brokerage server, such as a resource brokerage server 226 accessible via the first network channel 206. In other embodiments, the resource brokerage agent is a resource brokerage server on a network inaccessible to the first application 204. In those embodiments, the first application 204 can communicate with a remote resource brokerage server 228 through an access resource provider, such as the fourth device 216.

Figure 3:
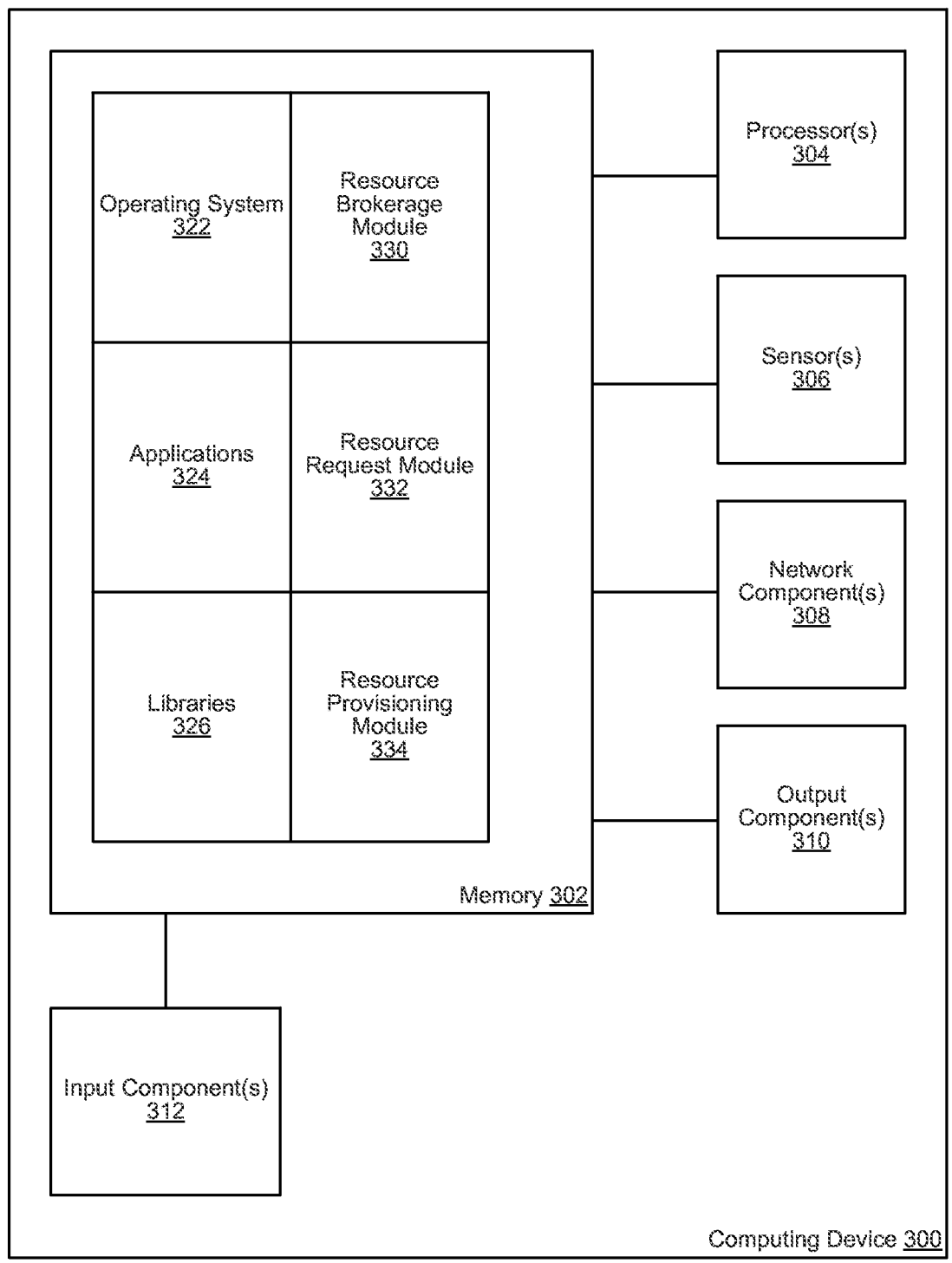
FIG. 3 is a block diagram of a computing device implementing a resource sharing and balancing mechanism, in accordance with various embodiments.

FIG. 3 is a block diagram of a computing device 300 implementing a resource sharing and balancing mechanism, in accordance with various embodiments. For example, the computing device 300 can be part of a cloud computing system, such as the cloud computing system 100 of FIG. 1 or the cloud computing system 200 of FIG. 2. The computing device 300 includes at least a memory 302 and one or more processors 304. The computing device 300 can also include one or more sensor components 306 (e.g., a camera, a microphone, a Bluetooth sensor, a NFC sensor, a radio sensor, a GPS sensor, etc.), one or more network components 308 (e.g., a Bluetooth component, a cellular network component, a Wi-Fi component, etc.), one or more output components 310 (e.g., a display, a printer, a speaker, etc.), and one or more input components 312 (e.g., a touch screen, a keyboard, a mouse, etc.), or a combination thereof. All these components can be used as resources within the cloud computing network implemented by the cloud computing system.

The memory 302 may include multiple modules that may be executed by the one or more processors 304. The memory 302 includes an operating system 322. The operating system 322 is a collection of software instructions that manages computer hardware resources, such as the components 302, 304, 306, 308, 310, and 312, and provides services for computer programs and other software modules. One or more computer programs, such as an application 324, can run on the operating system 322 when executed by the one or more processors 304. The application 324 can utilize one or more libraries 326 that are available through the operating system 322. A "library" is a collection of instructions that generate a well-defined interface by which software instruction behaviors can be invoked. A library can be linked or loaded to the application 324 at the start of the execution of the application 324 or in the middle of execution. A library can provide instruction frameworks or packages that are part of the application 324 or referenced by the application 324. For example, the libraries 326 can enable different application developers to utilize a common implementation of a protocol or interface to communicate between software agents.

At least a portion of the logic behind the cloud computing system (i.e., the resource sharing platform) can be implemented in one or more logic modules in the memory 302 executable by the processors 304. For example, the memory 302 can include a resource brokerage module 330, a resource request module 332, and a resource provisioning module 334. The resource brokerage module 330 can provide similar or identical services as the resource brokerage server 226 of FIG. 2 and vice versa. The resource brokerage module 330 can be a resource brokerage agent as discussed above in this disclosure. The resource brokerage module 330 is configured to maintain a list of accessible resource providers for the computing device 300. The resource brokerage module 330 can dynamically add or remove resource providers from the list based on ownership changes, powering on and off the computing devices, network reachability of the computing devices, and other factors that may affect availability of the resources in the computing devices, etc. A user account can identify itself with the resource brokerage module 330. The list of accessible resource providers can be computing devices associated with the user account.

The resource brokerage module 330 can periodically, or upon request, update functional capabilities and attributes of the accessible resource providers. The resource brokerage module 330 can receive resource requests, such as the resource requests 108 of FIG. 1. In response to receiving a resource request, the resource brokerage module 330 can determine a subset of the accessible resource providers that satisfy the resource request. From amongst the subset, the resource brokerage module 330 can select a specific resource provider by comparing limitations (e.g., comparable limitations) of the resource providers of the subset.

The resource brokerage module 330 can be part of the application 324. The resource brokerage module 330 can also be part of the libraries 326 or the operating system 322. The resource brokerage module 330 can run a background process on the operating system 322 accessible to any application running on the operating system 322. In embodiments, the resource brokerage module 330 can run a service accessible within the operating system 322 and/or across a network (e.g., via the network components 308).

The resource request module 332 provides an interface that facilitates generation of a resource request for the application 324. The resource request module 332 can send the generated resource request to a resource brokerage agent (e.g., a resource brokerage server or an instance of the resource brokerage module 330 within the computing device 300 or an external computing device). For example, the resource request module 332 enables the application 324 to determine available resources that may be requested. The resource request module 332 can also proactively identify resources that can facilitate the application 324 by monitoring service requests from the application 324 to the operating system 322 and its libraries 326.

Upon identifying resources that can enhance the user experience of the application 324, including resources required for the execution of the application 324, the resource request module 332 can generate a specific message representing the resource request. The resource request module 332 can identify at least one of a resource type, a device functionality requirement, a device attribute, and a response schedule that can be used as criteria for a resource brokerage agent (e.g., the resource brokerage module 330) to select a potential resource provider. The resource type, device functionality requirement, device attribute, and response schedule can be provided by the application 324. In some embodiments, the resource request module 332 can derive and determine at least one of the resource type, the device functionality requirement, the device attribute, and the response schedule based on an application state (e.g., application configuration, user profile of a user of the application 324, other user behavior patterns, operation system communication patterns, etc.) of the application 324.

The resource request module 332 can be part of the application 324. The resource request module 332 can also be part of the libraries 326 or the operating system 322. The resource request module 332 can replace or modify existing services and/or drivers (e.g., the drivers or controllers for the components 302, 304, 306, 308, 310, and 312) running on the operating system. For example, the resource request module 332 can replace or modify a GPS service/driver running on the operating system 322. This replacement enables the resource request module 332 to identify a need or preference of the application 324 for a particular resource and thus generate a resource request associated therewith. The resource request module 332 can run a background process on the operating system 322 accessible to any application running on the operating system 322. In embodiments, the resource request module 332 can run a service accessible within the operating system 322 and/or across a network (e.g., via the network components 308).

The resource provisioning module 334 is an interface that facilitates reporting of available resources to a resource brokerage agent (e.g., an instance of the resource brokerage module 330) and fulfillment of resource requests. For example, the resource provisioning module 334 can actively or passively maintain a list of the available resources on the computing device 300, such as the available resources associated with the components 302, 304, 306, 308, 310, and 312. When actively maintaining the list, the resource provisioning module 334 can discover the available resources by interfacing with the operating system 322. The resource provisioning module 334 can also add or remove resources from the list in response to changes in the availability of the resources (e.g., when a resource becomes committed to a resource request, when a component associated with a resource fails or is shut off, or when a secondary resource in support of a primary resource becomes depleted). When passively maintaining the list, the resource provisioning module 334 awaits for an operator user, a network message, a system message, or an application to add or remove resources to or from the list. The resource provisioning module 334 can periodically or dynamically upon request report the list of the available resources to one or more resource brokerage agents.

The resource provisioning module 334 can receive a resource request from a resource brokerage agent (e.g., a resource brokerage server or an instance of the resource brokerage module 330 within the computing device 300 or an external computing device) for a requesting device. In response, the resource provisioning module 334 can commit a resource identified by the resource request to the requesting device. The resource provisioning module 334 can execute a command or a task in response to receiving the resource request in order to fulfill the resource request. For example, the resource provisioning module 334 can request data from one of the sensor components 306 or the input components 312, schedule a command or computation activity to be performed by one of the processors 304 and/or the output components 310, retrieve or store data from the memory 302, or relay data through one of the network components 308.

The resource provisioning module 334 can be a standalone application running on the operating system 322. The resource provisioning module 334 can also be part of the libraries 326 or the operating system 322. The resource provisioning module 334 can replace or modify existing services and/or drivers (e.g., the drivers or controllers for the components 302, 304, 306, 308, 310, and 312) running on the operating system. For example, the resource provisioning module 334 can replace or modify a GPS service/driver running on the operating system 322. This replacement enables the resource provisioning module 334 to take over operations of these components in order to fulfill resource requests and/or to determine comparable limitations of available resources. The resource provisioning module 334 can run a background process on the operating system 322 accessible to any application running on the operating system 322. In embodiments, the resource provisioning module 334 can run a service accessible within the operating system 322 and/or across a network (e.g., via the network components 308).

The modules described herein can be implemented as instructions on a tangible storage memory capable of being executed by a processor or a controller. The tangible storage memory may be volatile or non-volatile memory. In some embodiments, the volatile memory may be considered "non-transitory" in the sense that it is not a transitory signal. Modules may be operable when executed by a processor or other computing device (e.g., a single-chip board, application specific integrated circuit, a field-programmable gate array (FPGA), a network capable computing device, a virtual machine, a cloud-based computing device, or any combination thereof). Memory spaces and storages accessible to the modules can be implemented with tangible storage memory as well, including volatile or non-volatile memory.

Each of the modules/components may operate individually and independently of other modules or components. Some or all of the modules may be executed by different computing components. The separate computing components can be coupled through one or more communication channels (e.g., wireless or wired channels) to coordinate their operations. Some or all of the modules may reside on different memory devices. Some or all of the components and/or modules may be combined as one component or module.

A single module/component may be divided into sub-modules, each sub-module performing a separate method step or method steps of the single module/component. In some embodiments, at least some of the modules share access to a memory space. For example, one module may access data accessed by or transformed by another module. The modules/components may be considered "coupled" to one another if they share a physical connection or a virtual connection, directly or indirectly, allowing data accessed or modified from one module to be accessed in another module.

Figure 4:
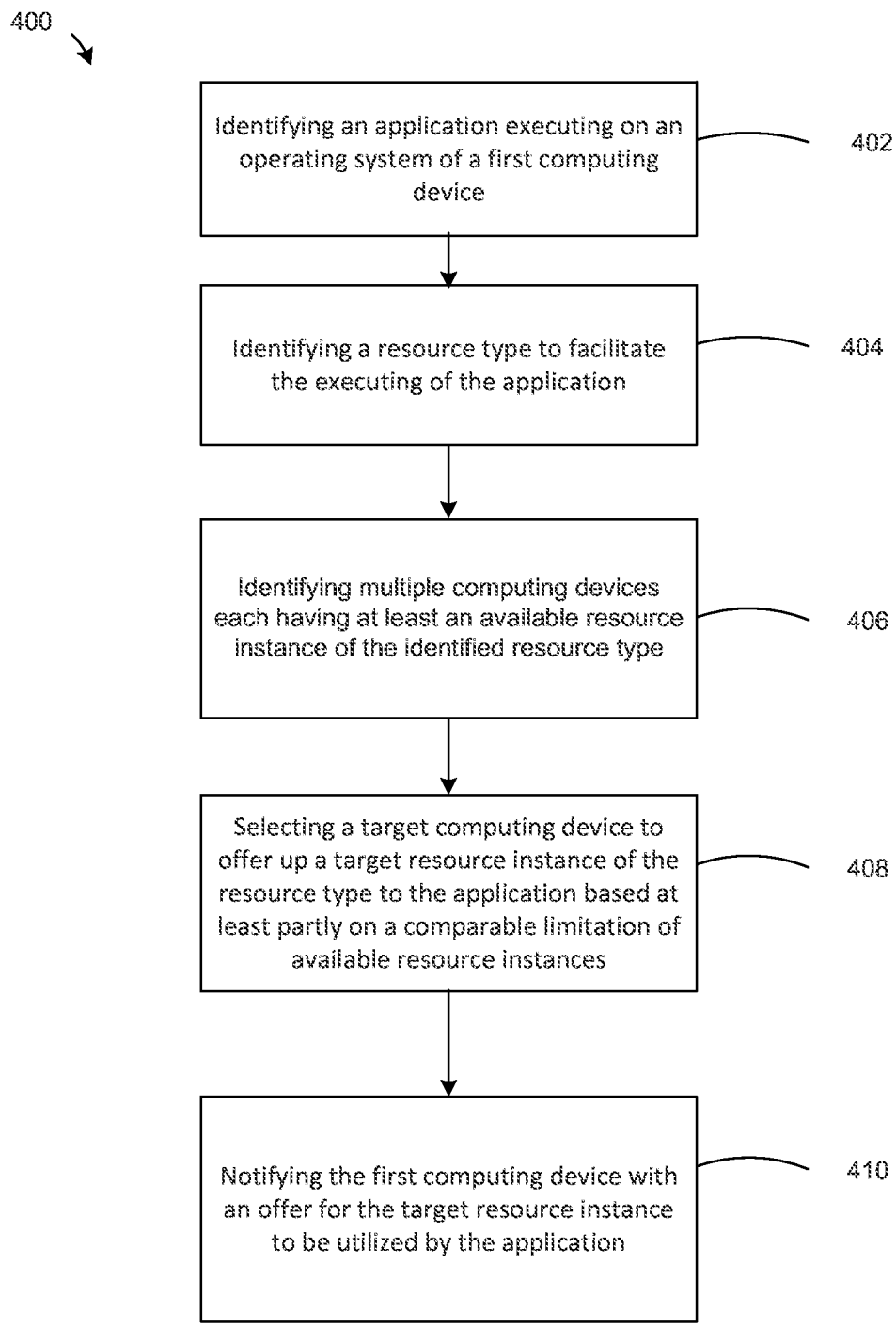
FIG. 4 is a flow chart of a method of brokering resources, in accordance with various embodiments.

FIG. 4 is a flow chart of a method 400 of brokering resources for computing devices, in accordance with various embodiments. A resource brokerage process (e.g., the resource brokerage module 330 of FIG. 3) within a computing device can broker resources for an application executing on the computing device. Alternatively, a resource brokerage device (e.g., the resource brokerage server 226 of FIG. 2) external to the computing device can broker resources for the application executing on the computing device. For the purpose of this disclosure, a "resource brokerage agent" can refer to either the internal resource brokerage process or the external resource brokerage device.

The resource brokerage agent identifies an application (e.g., the application 324 of FIG. 3) executing on an operating system (e.g., the operating system 322 of FIG. 3) of a first computing device in step 402. The resource brokerage agent can then identify a resource type to facilitate the executing of the application in step 404. In some embodiments, both steps 402 and 404 can be in response to the resource brokerage agent receiving a resource request (externally or internally) from an application or a resource request module (e.g., the resource request module 332 of FIG. 3). In other embodiments, the resource brokerage agent executing on the first computing device can perform step 402 and/or step 404.

In response to the resource request, the resource brokerage agent identifies, in step 406, multiple computing devices each having at least an available resource instance of the identified resource type. The resource brokerage agent can specifically identify computing devices that are reachable by a communication protocol of the first computing device and/or accessible based on a user profile associated with the execution of the application, such as a user account associated with a user operating the first computing device. In embodiments, the first computing device can be one of the multiple computing devices.

The resource brokerage agent selects, in step 408, a target computing device from the multiple computing devices to offer up a target resource instance of the resource type to the application based at least partly on a comparable limitation of each available resource instance of the multiple computing devices. The resource brokerage agent can also select the target computing device based at least partly on a timing restriction of when the application requires to utilize the target resource instance.

Step 408 reflects the disclosed resource balancing mechanism discussed above. The comparable limitation can be a limited availability of resource instances of the resource type in each of the multiple computing devices. The comparable limitation can be an availability of a secondary resource that is consumed when each resource instance is offered and utilized by the application. The comparable limitation can further be an amount of the secondary resource in a computing device that would be consumed if that computing device is selected as the target computing device. For example, the secondary resource can be battery power consumption or a network data plan usage through an Internet service provider. The comparable limitation can also be a location of each of the multiple computing devices relative to the first computing device.

Subsequently, the resource brokerage agent notifies, in step 410, the first computing device with an offer for the target resource instance to be utilized by the application. The resource brokerage agent can further facilitate any data transfer between the first computing device and the target computing device to fulfill the resource request for the application.

Figure 5:
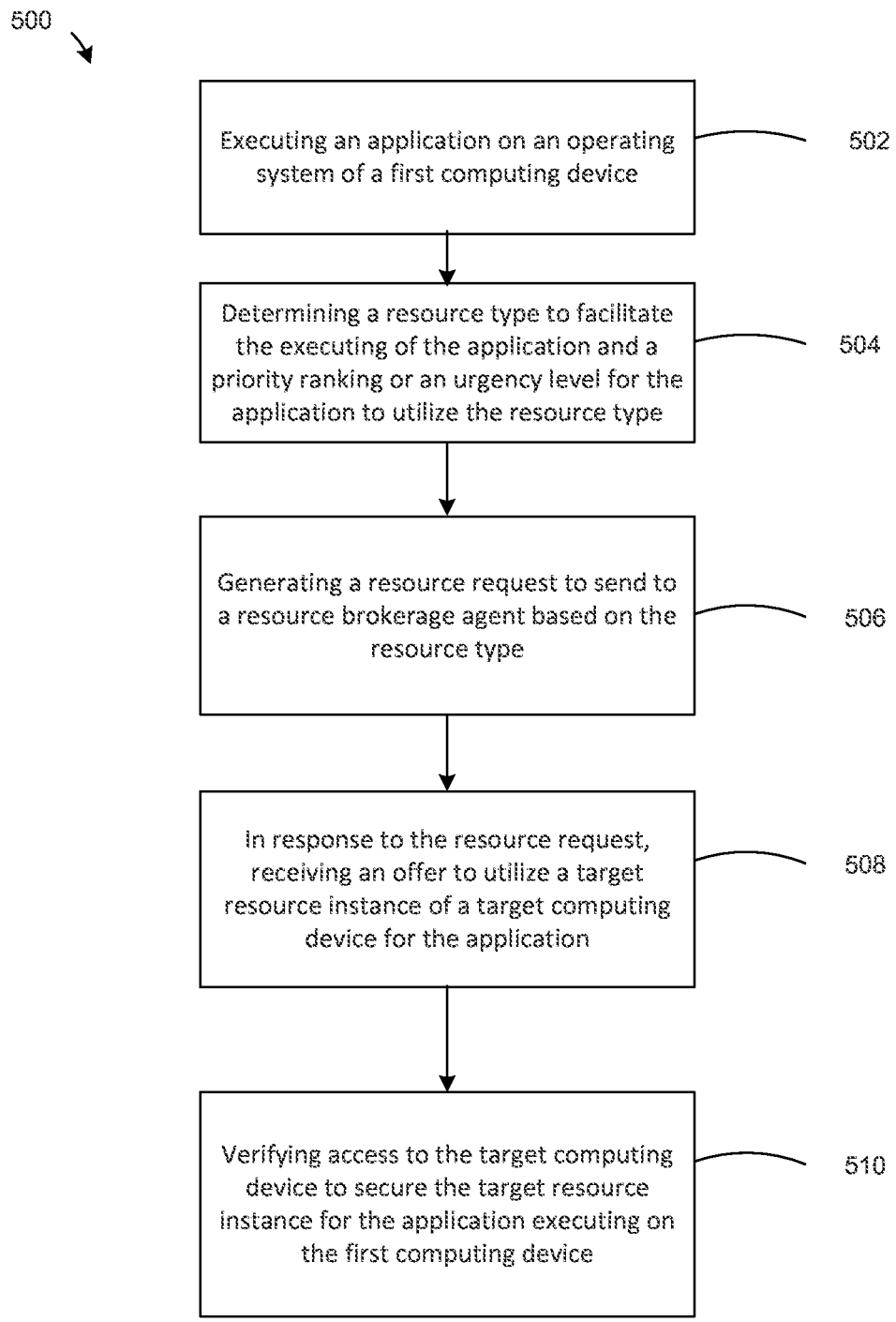
FIG. 5 is a flow chart of a method of automatically balancing resources for an application, in accordance with various embodiments.

FIG. 5 is a flow chart of a method 500 of automatically balancing resources for an application, in accordance with various embodiments. For example, the application can be the application 106 of FIG. 1, the first application 204 of FIG. 2, or the application 324 of FIG. 3. The method 500 begins with executing an application on an operating system of a first computing device in step 502. Then a process (e.g., the resource request module 332 of FIG. 3) running on the first computing device can determine, in step 504, a resource type to facilitate the executing of the application. Step 504 can also include determining a priority ranking or an urgency level for the application to utilize the resource type. The resource type may be a resource type that is required for the executing of the application or a resource type that enhances user experience provided through the application (e.g., when the resource type is not required by the application).

For example, as part of step 504, the process can identify a data resource that provides one or more data values to the application, a task resource that is capable of executing a process or generating an output requested by the application, or an access resource that enables the application to gain access to another device external to the first computing device. The process can receive a request from the application that specifically asks for the resource type. The process can also detect any resource request made by the application to the operating system or to a resource brokerage agent, identifying the resource type.

The process generates, in step 506, a resource request to send to a resource brokerage agent (e.g., the resource brokerage server 226 or the remote resource brokerage server 228 of FIG. 2, or the resource brokerage module 330 of FIG. 3) based on the resource type. The resource request can further be based on a timing restriction of when the application requires or desires to utilize the target resource instance. In response to the resource request, the first computing device receives, in step 508, an offer to utilize a target resource instance of a target computing device for the application. The first computing device can further verify access to the target computing device, in step 510, to secure the target resource instance for the application executing on the first computing device.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 6:
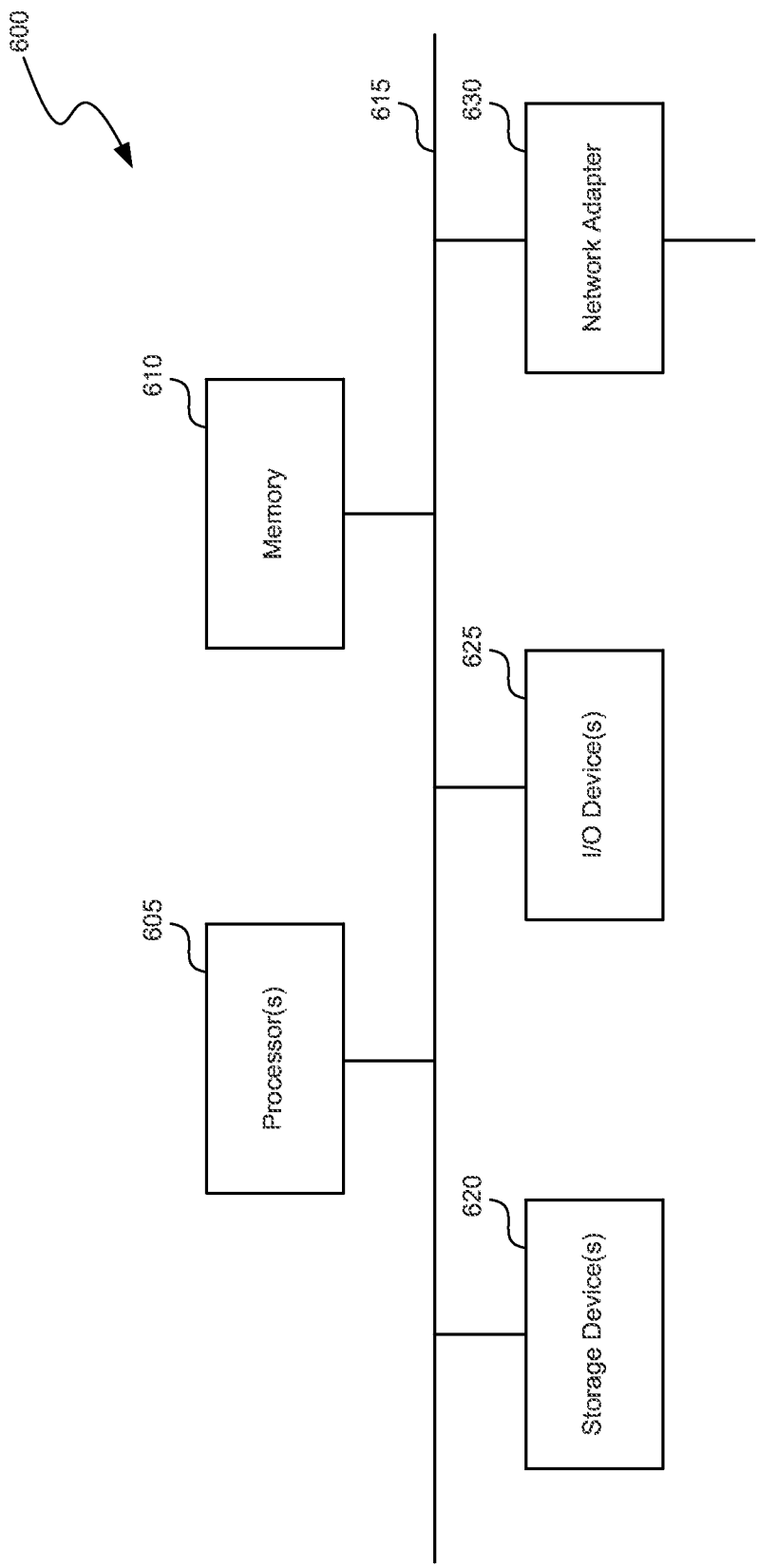
FIG. 6 is a block diagram of a computing system that may be used to implement features of some embodiments of the disclosed technology.

FIG. 6 is a block diagram of a computing system as may be used to implement features of some embodiments of the disclosed technology. The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point-to-point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 610 and storage devices 620 are computer-readable storage media that may store instructions that implement at least portions of the described technology. In addition, the data structures and message structures may be stored or transmitted via a data transmission medium, such as a signal on a communications link. Various communications links may be used, such as a local area network, a wide area network, a point-to-point dial-up connection, other communication protocols, or any combination thereof. Thus, computer-readable media can include computer-readable storage media (e.g., "non-transitory" media) and computer-readable transmission media.

The instructions stored in memory 610 can be implemented as software and/or firmware to program the processor(s) 605 to carry out actions described above. In some embodiments, such software or firmware may be initially provided to the computing system 600 by downloading it from a remote system through the computing system 600 (e.g., via at least one of the network adapters 630).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

From the foregoing, it will be appreciated that specific embodiments of the disclosed technology have been described herein for purposes of illustration, but that various modifications may be made without deviating from the technology. For example, resource brokerage agent can be a standalone server or a cloud-based module that is implemented on any computing device or multiple computing devices within a cloud network. Certain aspects of the invention described in the context of particular embodiments may be combined or eliminated in other embodiments. For example, a resource brokerage agent (e.g., the resource brokerage module 330 of FIG. 3) and a resource request agent (e.g., the resource request module 332 of FIG. 3) can be combined into a single module. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. It will be appreciated that the same thing can be said in more than one way. One will recognize that "memory" is one form of a "storage" and that the terms may on occasion be used interchangeably. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

What is claimed is:

1. A method of operating a resource brokerage system, comprising:
    identifying an application executing on an operating system of a first computing device;
    identifying a resource type to facilitate the executing of the application;
    identifying multiple computing devices each having at least an available resource instance of the identified resource type, wherein the multiple computing devices are reachable by a communication protocol of the first computing device;
    selecting a target computing device from the multiple computing devices to offer up a target resource instance of the resource type to the application based at least partly on a comparable limitation of each available resource instance of the multiple computing devices; and
    notifying the first computing device with an offer for the target resource instance to be utilized by the application.

2. The method of claim 1, further comprising: receiving a resource request over a network from the application, the resource request indicating the resource type; and wherein identifying the application and determining the resource type are based on the resource request.

3. The method of claim 1, further comprising: receiving a resource request from the application executing on the operating system, the resource request indicating the resource type; and wherein identifying the application and determining the resource type are based on the resource request and wherein the selecting is also performed on the operating system.

4. The method of claim 1, wherein identifying the multiple computing devices includes identifying the first computing device as one of the multiple computing devices.

5. The method of claim 1, wherein the comparable limitation is a limited availability of resource instances of the resource type in each of the multiple computing devices.

6. The method of claim 1, wherein the comparable limitation is an availability of a secondary resource that is consumed when each available resource instance is offered and utilized by the application.

7. The method of claim 6, wherein the secondary resource is battery power consumption level of each of the multiple computing devices.

8. The method of claim 6, wherein the secondary resource is data plan usage through an Internet service provider of each of the multiple computing devices.

9. The method of claim 1, wherein the comparable limitation is a location of each of the multiple computing devices relative to the first computing device.

10. The method of claim 1, wherein identifying the multiple computing devices includes identifying the multiple computing devices that are accessible based on a first user profile associated with the execution of the application.

11. The method of claim 1, wherein selecting the target computing device is further based at least partly on a timing restriction of when the application requires to utilize the target resource instance.

12. A device comprising:
    a memory storing executable instructions;
    a processor configured by the executable instructions to:
        identify an application executing on an operating system;
        identify a resource type to facilitate the executing of the application;
        identify multiple computing devices each having at least an available resource instance of the identified resource type, wherein the multiple computing devices are accessible to the application based on a first user profile associated with the execution of the application; and
        select a target computing device from the multiple computing devices to offer up a target resource instance of the resource type to the application based at least partly on a comparable limitation of each available resource instance of the multiple computing device.

13. The device of claim 12, wherein the processor is configured to identify the application executing on the operating system implemented by the processor.

14. The device of claim 12, wherein the processor is configured to identify the application executing on the operating system implemented external to the device.

15. The device of claim 12, wherein the processor is configured to receive a resource request over a network from the application, the resource request indicating the resource type, further wherein the processor is configured to identify the application and the resource type based on the resource request.

16. The device of claim 12, wherein identifying the multiple computing devices includes identifying the first computing device as one of the multiple computing devices.

17. The device of claim 12, wherein the comparable limitation is a limited availability of resource instances of the resource type in each of the multiple computing devices.

18. The device of claim 12, wherein the comparable limitation is an availability of a secondary resource that is consumed when each available resource instance is offered and utilized by the application.

19. The device of claim 18, wherein the secondary resource is battery power consumption level of each of the multiple computing devices.

20. The device of claim 18, wherein the secondary resource is data plan usage through an Internet service provider of each of the multiple computing devices.

21. The device of claim 12, wherein the comparable limitation is a location of each of the multiple computing devices relative to the first computing device.

22. The device of claim 12, wherein identifying the multiple computing devices includes identifying the multiple computing devices that are accessible based on a first user profile associated with the execution of the application.

23. The device of claim 12, wherein selecting the target computing device is further based at least partly on a timing restriction of when the application requires to utilize the target resource instance.

24. A non-transitory computer-readable storage medium storing instructions that when executed by a computer cause the computer to perform a method for operating a resource brokerage system, the method comprising:
   identifying an application executing on an operating system of a first computing device;
   identifying a resource type to facilitate the executing of the application;
   identifying multiple computing devices each having at least an available resource instance of the identified resource type, wherein the multiple computing devices are reachable by a communication protocol of the first computing device;
   selecting a target computing device from the multiple computing devices to offer up a target resource instance of the resource type to the application based at least partly on a comparable limitation of each available resource instance of the multiple computing devices; and
   notifying the first computing device with an offer for the target resource instance to be utilized by the application.

25. The non-transitory computer-readable storage medium of claim 24, wherein the method further comprises:
   receiving a resource request over a network from the application, the resource request indicating the resource type; and
   identifying the application and determining the resource type are based on the resource request.

26. The non-transitory computer-readable storage medium of claim 24, wherein identifying the multiple computing devices includes identifying the first computing device as one of the multiple computing devices.

27. The non-transitory computer-readable storage medium of claim 24, wherein the comparable limitation is a limited availability of resource instances of the resource type in each of the multiple computing devices.

28. The non-transitory computer-readable storage medium of claim 24, wherein the comparable limitation is an availability of a secondary resource that is consumed when each available resource instance is offered and utilized by the application.

29. The non-transitory computer-readable storage medium of claim 24, wherein the secondary resource is battery power consumption level of each of the multiple computing devices.

30. The non-transitory computer-readable storage medium of claim 24, wherein the secondary resource is data plan usage through an Internet service provider of each of the multiple computing devices.

* * * * *